3,326,832
SELF-EXTINGUISHING PLASTICS
COMPOSITIONS
Rolf Dieter Rauschenbach and Herbert Naarmann, Ludwigshafen (Rhine), Ferdinand Meyer, Ziegelhausen, and Rudolf Ilgemann, Ludwigshafen (Rhine), Germany, assignors to Badische Anilin- & Soda-Fabrik Aktiengesellschaft, Ludwigshafen (Rhine), Germany
No Drawing. Filed Jan. 21, 1964, Ser. No. 339,113
Claims priority, application Germany, Jan. 23, 1963, B 70,435
1 Claim. (Cl. 260—28.5)

This invention relates to self-extinguishing plastics compositions and more specifically to plastics compositions which contain a styrene polymer, an organic chlorine or bromine compound and a metal chelate compound.

The use of substances containing bromine or chlorine as flame retardants or flameproofing agents for thermoplastic polymers is known. In order to achieve adequate self-extinguishing properties it is necessary to add relatively large amounts of halogen-containing substances to the polymers. Certain other properties are however detrimentally affected by the addition of such large amounts.

Enhancing the flame retardant effect of bromine-containing compounds by additives is also known and adequate self-extinguishing characteristics can thus be obtained with substantially smaller amounts of brominecontaining compounds. For example it is possible to improve the flame retardant effect of organic bromine compounds by adding organic peroxides. Organic peroxides have the disadvantage however that they are toxic and sometimes readily decompose explosively. Dermatosis may occur in the case of sensitive personnel who handle such peroxides. Moreover expensive and troublesome precautions must be taken in the handling of peroxides to prevent explosions.

The use of chlorinated hydrocarbons with antimony trioxide as fire-retardants or flameproofing agents for thermoplastic polymers is also known. A disadvantage of this is that a relatively large amount of antimony trioxide is required so that the mechanical properties are detrimentally affected. Moreover in certain polymerization methods, for example in bead polymerization, antimony trioxide cannot be added to the monomers because it is not homogeneously distributed in the bead polymer.

It is an object of the present invention to provide self-extinguishing plastics compositions which contain smaller amounts of organic chlorine or bromine compounds than the prior art materials. Another object of the invention is to provide self-extinguishing plastics compositions which contain a substance which enhances the flame retardant effect of the organic chlorine or bromine compound and which does not have the disadvantages of the prior art substances used for this purpose. A particular object of the invention is the provision of expandable self-extinguishing plastics compositions.

These objects are achieved by a plastics composition which contains:
(A) a styrene polymer,
(B) an organic chlorine or bromine compound as flameproofing agent and
(C) a metal chelate compound of a metal of group I-B, II-B, IV-B, V-A, VI-B, VII-B or VIII of the periodic system of elements (Handbook of Chemistry and Physics, 38th edition, pp. 394 and 395, Chemical Rubber Publishing Co., Cleveland, Ohio).

The styrene polymers (A) according to the invention include polystyrene and copolymers of styrene which contain at least 50 mole percent of styrene in polymerized form. Examples of co-monomers are acrylonitrile, esters of acrylic or methacrylic acid with alcohols having one to eight carbon atoms, vinylcarbazole, butadiene or small amounts of divinylbenzene.

Suitable flameproofing agents (B) are organic chlorine or bromine compounds, particularly those containing between 40 and 86% by weight of halogen.

Particularly suitable organic chlorine compounds are for example chlorinated cyclic hydrocarbons containing 5 to 12 C-atoms such as hexachlorocyclododecane, hexachlorocyclopentadiene and chlorinated diphenyl. Hexachloroendomethylenetetrahydrophthalic acid, tetrachlorobutyrolactone and tetrachlorobutanediol diacetate are also effectual. High molecular weight chlorine-containing compounds which do not affect, or only affect to an insignificant extent, the properties of the styrene polymers are particularly suitable. Examples of such compounds are after-chlorinated polyvinyl chloride having a chlorine content of about 58 to 63% by weight, chlorinated polyisobutylene having a chlorine content of about 60 to 65% by weight and chlorinated polystyrene having a chlorine content of about 40 to 50% by weight. Chlorinated paraffins having a chlorine content of 60 to 75% by weight and whose carbon chain contains at least eighteen and up to forty carbon atoms are also particularly suitable. In all cases it is preferable to use chlorine compounds having a high chlorine content so that the amount thereof in the plastics composition is kept as low as possible. The chlorine compounds are added in amounts such that they have a chlorine content of at least 3% by weight. In most cases it is not necessary for the composition to contain more than 10% by weight of chlorine. The compositions preferably contain 4 to 8% by weight of chlorine.

Organic bromine compounds having a high bromine content are the most suitable as flame-retardants. For example tetrabromobutane, dibromoethylbenzene, dibromopropanol or esters or acetals of dibromopropanol, for example tris-(dibromopropyl) phosphate, and also pentabromodiphenyl ethers are suitable. Organic bromine compounds which do not easily volatilize, which do not or do not appreciably affect the properties of the styrene polymers and which do not have an objectionable odor are particularly suitable. These include particularly the bromination products of butadiene polymers having a degree of polymerization of 2 to 2000, for example hexabromocyclododecane, octabromohexadecane or brominated natural or synthetic rubber. The bromine compounds are used in such amounts that the plastics compositions have a bromine content of at least 1% by weight. In most cases it is unnecessary for the compositions to contain more than 5% by weight. The compositions preferably contain 1.5 to 3% by weight of bromine.

We understand by metal chelate compounds those compounds in which a metal atom is attached coordinately and by principal valences to two functional groups of a molecule. Compounds of this type are described for example in the book "Chemistry of the Metal Chelate Compounds" by Arthur E. Martell and Melvin Calvin (New York, Prentice-Hall Inc., 1952).

β-diketones, such as acetylacetone, β-ketocarboxylic esters, such as ethyl acetoacetate, oxyaldehydes, such as salicylaldehyde, or aminocarboxylic acids, such as anthranilic acid (o-aminobenzoic acid), are particularly suitable as compounds forming chelate complexes which contain in the molecule two functional groups of which one may be attached to the metal atom by principal valences and the other coordinately. In the case of an acetylacetonate, the metal chelate compounds may be represented by the following formula:

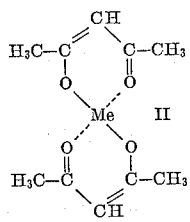

in which $Me^{II}$ denotes a divalent metal of the above-mentioned groups. Me may however also be monovalent, trivalent or have a higher valence than three.

Some of the principal or subsidiary valences of the metal may also be saturated by other ligands. Examples of such ligands are $CN^-$, $OH^-$, $CO$, $O^{--}$, primary, secondary or tetriary organic amines, such as trimethylamine pyridine or diethylamine.

Examples of particularly suitable metal chelate compounds are the acetylacetonates of copper, zinc, mercury, titanium, chromium, molybdenum, manganese, iron, cobalt, the chelate compounds of ethyl acetoacetate and copper, nickel salicylaldehyde and chromium anthranilate.

The metal chelate compounds (C) are contained in the plastics composition in amounts of from 0.05 to 5, preferably from 0.1 to 2% by weight.

The plastics compositions may be processed into self-extinguishing molded articles or sections for example by injection molding or extrusion. When dissolved in organic solvents, the plastics materials are suitable as self-extinguishing lacquers, for example for coating wood or metal. Owing to their relatively low content of organic halogen compounds, the molded articles according to this invention have softening points which differ but slightly from those of the polymers contained therein.

Plastics compositions which are suitable for the production of self-extinguishing expanded articles are of particular importance. These contain not only (A) a styrene polymer, (B) an organic chlorine or bromine compound and (C) a chelate complex compound, but also (D) an expanding agent. Expanding agents are hydrocarbons or chlorofluorohydrocarbons which are gaseous or liquid under normal conditions, which do not dissolve the styrene polymer (A) and which have a boiling point which is below the softening point of the polymer (A). Examples of suitable expanding agents are propane, butane, pentane, hexane, cyclohexane, dichlorodifluoromethane and trifluorochloromethane.

The expanding agent may be contained in the expandable plastics composition in amounts of 2 to 20% by weight with reference to the plastics composition. Self-extinguishing expanded shaped articles are obtained from expandable plastics compositions of the said type when fine particles of such compositions are heated in a gas-permeable mold at temperatures above the softening point of the polymer contained in the composition so that the particles expand and weld together to form a shaped article. These expandable plastics compositions may be processed to expanded plastics sheets by means of extruders. Other components may be contained in the plastics compositions, for example fillers, dye pigments, lubricants, antistatics and plasticizers.

For the production of the plastics compositions, the chelate complex compounds, together with the organic halogen compound, or separately and successively, are mixed with the styrene polymer and any other components used. They may be incorporated into the plastic for example on rollers, in an extruder or in a kneader. In many cases they may be added to the monomers prior to polymerization. It is also possible, for example in the production of cast films, to add the chelate complex compound together with the halogen compound to a solution of the plastic in which they remain after the solvent has been removed.

Since the chelate complex compounds are also suitable as catalysts for the polymerization of unsaturated monomers, it is particularly advantageous to prepare mixtures of monomers, halogen compound and chelate complex compound and to convert them by polymerization into the self-extinguishing moldings according to this invention. This method is particularly advantageous because the chelate complex compounds serve both as catalysts for the polymerization of the monomers and as synergists for increasing the flame retardant effect of the halogen compounds.

In the particular case of self-extinguishing expandable granular compositions containing an expanding agent, it is accordingly most advantageous to convert mixtures of monomers, chelate complex compounds, halogen compounds and expanding agents into self-extinguishing expandable granular compositions containing expanding agents by bead polymerization in aqueous suspension.

The self-extinguishing plastics compoistions according to this invention are distinguished particularly by the fact that they contain smaller amounts of chlorine or bromine compounds than the prior art plastics materials. The mechanical properties of the compositions therefore differ but slightly or not at all from those of the styrene polymers contained therein. It is also an advantage that the metal chelate complex compounds, in contrast to peroxides, can be handled without any risk so that no precautions need be taken in the production of the plastics compositions according to this invention.

The self-extinguishing property of the plastics materials is tested in the following way:

To test an unexpanded plastics material, a molding having the dimensions 0.1 x 3 x 12 cm., and for testing an expanded plastics material, a molding having the dimensions 3 x 3 x 12 cm. is held for five seconds in the non-luminous flame of a Bunsen burner and then removed from the flame by a gentle movement. The period which elapses after the removal of the molding from the flame before the molding ceases to burn is a measure of the self-extinguishing property. A period of continued burning after the molding has been removed from the flame of 0 to 2 seconds may be regarded as very good, and that of 2 to 5 seconds as good. Self-extinguishing in less than ten seconds may be regarded as adequate. Molding compositions which have been given an inadequate flame retardant finish or none at all burn away completely after removal from the flame.

The invention is further illustrated by the following examples. The parts specified are parts by weight. The K-values are determined by the method of H. Fikentscher, Cellulosechemie, 13 (1932), 60.

EXAMPLE 1

1800 parts of styrene is polymerized at 85° C. in 4000 parts of water containing 4 parts of polyvinylpyrrolidone having a K-value of 70 dissolved therein, in an agitated autoclave in admixture with 200 parts of a chlorinated paraffin (18 to 40 carbon atoms) containing 70% by weight of chlorine, 200 parts of pentane and 18 parts of one chelate compound or a mixture of two chelate compounds. Table 1 below gives the chelate compounds used, the polymerization period and the K-values of the polymers obtained and also the extinction periods determined on foams which have been prepared from the polymers.

TABLE 1

| Test No. | Chelate complex compound | Parts | Time (hrs.) | K-value | Extinction period (seconds) |
|---|---|---|---|---|---|
| 1 | Cobalt (III) acetylacetonate | 18 | 25 | 67 | <2 |
| 2 | Molybdenum (III) acetylacetonate | 18 | 45 | 34 | <1 |
| 3 | Copper (II) acetoacetate | 18 | 45 | 39 | <1 |
| 4 | Manganese (III) acetylacetonate/chromium (III) acetylacetonate. | 9<br>9 | 40 | 64 | <2 |
| 5 | Chromium (III) acetylacetonate/cobalt (III) acetylacetonate. | 9<br>9 | 40 | 62 | <2 |
| 6 | Copper (II) acetoacetate/chromium (III) acetyl-acetonate. | 9<br>9 | 40 | 63 | <1 |
| 7 | No chelate complex compound (9 parts of benzoyl peroxide used as polymerization initiator). | | 35 | 59 | (¹) |

¹ Burns.

EXAMPLE 2

A number of batches, each of 20 parts of styrene, has definite amounts of chelate complex compound and chlorine compound dissolved therein and the mixture is polymerized for twenty hours at 95° C. The polymer is then dissolved in a mixture of 60 parts of methylene chloride and 3 parts of pentane and the resultant solutions are cast to films. After the methylene chloride has evaporated, films containing pentane remain behind which are expanded in boiling water to form sheets. The self-extinguishing property of the sheets is then tested by the abovementioned method. The following Table 2 gives the results obtained.

A foam prepared from a plastics composition containing no nickel salicylaldehyde but otherwise having the same composition burns away after it has been removed from the flame.

EXAMPLE 4

In a number of batches of 80 parts of methylene chloride, 20 parts of polystyrene (K-value 60), 3 parts of pentane and the chelate complex compound and bromine compound specified in Table 3 are dissolved and cast films are prepared from the solutions. After the solvent has evaporated, the remaining expandable film is expanded in boiling water. The self-extinguishing property of the expanded sheet is tested after it has been dried.

TABLE 2

| Test No. | Chelate complex compound | Parts | Chlorine compound | Parts | K-value | Extinction period of expanded sheet (seconds) |
|---|---|---|---|---|---|---|
| 8 | Chromium (III) acetylacetonate dibromide | 0.3 | Tetrachlorobutanediol diacetate | 2.5 | 45 | <10 |
| 9 | Copper (II) acetoacetate/cobalt (III) acetylacetonate. | 0.16<br>0.16 | Hexachlorocyclododecane | 2 | 56 | <5 |
| 10 | Copper (II) acetoacetate/manganese (III) acetylacetonate. | 0.16<br>0.16 | Chloroparaffin (Cl=70%; m.p. 120° C.) | 1.5 | 62 | ca. 2 |
| 11 | Nickel salicylaldehyde (not fully dissolved) | 0.2 | Chlorinated polyisobutylene; Cl=63% | 2 | 65 | 5–10 |
| 12 | Cobalt (II) acetylacetonate | 0.4 | Chloroparaffin (Cl=70%, m.p. 120° C.) | 1.6 | 40 | <10 |

EXAMPLE 3

1960 parts of styrene in admixture with 40 parts of hexabromocyclododecane, 200 parts of petroleum ether and 19.6 parts of nickel salicylaldehyde is polymerized in an agitated autoclave in 4000 parts of water containing 4 parts of polyvinylpyrrolidone having a K-value of 70 for five hours at 85° C., five hours at 90° C. and twenty hours at 95° C.

The polymer obtained has a K-value of 64.

Foams which are tested by the abovementioned methods cease to burn immediately after they have been removed from the flame.

All the sheets are self-extinguished in less than two seconds.

TABLE 3

| Test No. | Chelate complex compound | Parts | Bromine compound | Parts |
|---|---|---|---|---|
| 13 | Chromium (III) anthranilate | 0.1 | Pentabromodiphenyl ether | 1 |
| 14 | Manganese (III) acetylacetonate/nickel formate | 0.05<br>0.05 | Hexabromocyclododecane | 0.6 |
| 15 | Cobalt (III) acetylacetonate | 0.1 | ...do... | 0.6 |
| 16 | Copper (II) acetoacetate | 0.1 | ...do... | 0.6 |
| 17 | Chromium (III) acetylacetonate | 0.1 | Pentabromodiphenyl ether | 1 |

EXAMPLE 5

90 parts of polystyrene (K-value 60), 10 parts of a chlorinated diphenyl (59.8% of Cl) and 1 part of copper (II) acetoacetate are mixed homogeneously on a roll mill. A sheet is pressed from the mixture and tested as described above. It ceases to burn immediately after removal from the extraneous flame.

A plastics composition having the same composition apart from containing no copper(II) acetoacetate continues to burn after removal of the flame.

EXAMPLE 6

0.1 part of azodiisobutyronitrile and the amount of chelate complex compound and halogen compound set out in a Table 4 are dissolved in each of a number of batches of 20 parts of styrene and the mixture is polymerized for twenty hours at 80° C. The polymers are then processed into expanded sheets as described in Example 2. The self-extinguishing property of the sheets is then tested by the abovementioned method. Table 4 gives the results obtained:

TABLE 4

| Test No. | Chelate complex compound | Parts | Halogen compound | Parts | K-value | Extinction time, secs. |
|---|---|---|---|---|---|---|
| 18 | Copper acetylacetonate | 0.02 | Hexabromocyclododecane | 0.35 | 40.8 | 5 |
| 19 | Mercury acetylacetonate | 0.1 | ____do____ | 0.4 | 38.9 | 5 |
| 20 | Titanium acetylacetonate | 0.05 | ____do____ | 0.4 | 37.7 | 5 |
| 21 | Antimony tetrachloride acetylacetonate | 0.2 | ____do____ | 0.4 | 47.9 | 5 |
| 22 | Zinc acetylacetonate | 0.1 | Chloroparaffin (Cl=70%; m.p. 120° C.) | 1.6 | 44.2 | 5 |

If expanded sheets having the same composition without a content of chelate complex compound are prepared, the test specimens burn away completely after they have been removed from the extraneous flame.

EXAMPLE 7

2787 parts of a polystyrene granulate (K-value 60), 150 parts of pentane, 60 parts of hexabromocyclododecane and 3 parts of copper (I) acetylacetonate are mixed in an extruder. The extruded strand is cooled and granulated. Expanded articles prepared from the granulate cease to burn immediately they are removed from the extraneous flame. A test specimen having the same composition but without copper (I) acetylacetonate continues to burn after removal from the extraneous flame.

EXAMPLE 8

9.2 parts of polystyrene (K-value 60), 3 parts of pentane, 0.8 part of chloroparaffin (70% Cl, M.P. 120° C.), and 0.03 part of iron (III) acetylacetonate are dissolved in 50 parts of methylene chloride and an expanded sheet is prepared from the solution as described in Example 4. The sheet is self-extinguished in less than three seconds after removal from an extraneous flame, whereas an equivalent sheet not containing iron (III) acetylacetonate burns away after removal from the flame.

EXAMPLE 9

20 parts of one of the styrene copolymers given in the following Table 5, 0.1 part of copper (II) acetoacetate, the amount of hexabromocyclododecane specified in the table and 3 parts of pentane are dissolved in each case in 80 parts of methylene chloride. Cast films are prepared from the solution by the conventional method and these are expanded in boiling water after the solvent has been evaporated. The flame resistance of the films is tested after they have been dried. The period before the flame is extinguished in the case of each film is given in the table.

TABLE 5

| Test No. | Comonomers in parts | Amount in parts of hexabromo-cyclododecane | Extinction period in seconds |
|---|---|---|---|
| 23 | 90 styrene / 10 acrylonitrile | 0.6 | 5 |
| 24 | 92 styrene / 8 n-butyl acrylate | 0.8 | 8 |
| 25 | 95 styrene / 5 N-vinylcarbazole | 0.6 | 6 |

EXAMPLE 10

100 parts of a copolymer of 68 parts of styrene and 32 parts of acrylonitrile is homogeneously mixed on a roll mill with 8 parts of chloroparaffin (having 70% of chlorine) and 0.2 part of copper (I) acetylacetonate. A board prepared from the mixture, when tested by the method given above, ceases to burn immediately after removal from the extraneous flame. An otherwise identical composition which does not contain copper (I) acetylacetonate continues to burn after it has been removed from the extraneous flame.

EXAMPLE 11

100 parts of styrene in which 4 parts of tris-(2,3-dibromopropyl)-orthophosphoric acid ester and 0.2 part of copper (I) acetylacetones have been dissolved is polymerized for twenty hours at 95° C. under the action of 1 part of azodiisobutyronitrile. 20 parts of the composition obtained and 3 parts of pentane are dissolved in 60 parts of methylene chloride. The solution is poured out onto a polished steel plate. After the solvent has evaporated, a film containing pentane is obtained which is expanded in boiling water. The self-extinguishing property of the film is tested by the method given above. The film is self-extinguished in less than five seconds after removal from the extraneous flame.

We claim:

A self-extinguishing polymeric composition comprising:
(A) a polymer selected from the group consisting of polystyrene and copolymers of styrene which contain at least 50% by weight of styrene in polymerized form;
(B) a halogenated flameproofing agent containing 40 to 86% halogen and selected from the group consisting of chlorinated cyclic hydrocarbons containing 5 to 12 carbon atoms, chlorinated paraffins having a chlorine content of about 60 to 75% by weight, hexachloroendomethylene tetrahydrophthalic acid, tetrachlorobutryolactone, tetrachlorobutane diol diacetate, chlorinated polyisobutylene having a chlorine content of about 60 to 75% by weight, bromination products of butadiene polymers having a degree of polymerization of 2 to 2000, tris-(dibromopropyl)-phosphate, and pentabromodiphenyl ether, wherein said flameproofing agent is provided in such amount that when said agent is a chlorine containing compound the chlorine content of the total composition is from 3 to 10% by weight, and when said agent is a bromine containing compound the bromine content of the total composition is from 1 to 5% by weight, and
(C) 0.05 to 5% by weight, with reference to the composition, of a metal chelate compound of a metal of groups I–B, II–B, IV–B, V–A, VI–B, VII–B and VIII of the periodic system with a member selected from the group consisting of $\beta$-diketones, $\beta$-ketocarboxylic esters, hydroxyaldehydes and aminocarboxylic acids.

References Cited

UNITED STATES PATENTS

| | | | |
|---|---|---|---|
| 2,465,296 | 3/1949 | Swiss | 260—45.75 |
| 2,615,860 | 10/1952 | Burgess | 260—45.75 |
| 2,669,521 | 2/1954 | Bierly | 106—15 |
| 2,676,946 | 4/1954 | McCurdy et al. | 260—45.75 |
| 2,924,532 | 2/1960 | Dereich | 260—28.5 |

MORRIS LIEBMAN, *Primary Examiner.*

B. A. AMERNICK, *Assistant Examiner.*